United States Patent [19]
Vartanian

[11] 3,741,179
[45] June 26, 1973

[54] EXHAUST GAS RECIRCULATING SYSTEM CONTROL
[75] Inventor: Richard D. Vartanian, Dearborn, Mich.
[73] Assignee: Ford Motor Company, Dearborn, Mich.
[22] Filed: July 1, 1971
[21] Appl. No.: 158,755

[52] U.S. Cl................. 123/119 A, 55/419, 55/420, 55/DIG. 28, 137/540
[51] Int. Cl.......................................... F02m 25/06
[58] Field of Search...................... 55/314, 419, 418, 55/510, DIG. 28; 123/119 R, 119 A, 119 B, 122 D; 137/540

[56] References Cited
UNITED STATES PATENTS 2,408,846   10/1946   Golden et al................... 123/119 A
2,543,194   2/1951    Paris, Jr.......................... 123/119 A
3,313,281   4/1967    Schneider........................ 123/119 B
3,368,345   2/1968    Walker........................ 123/119 B X
3,450,119   6/1969    Sendelback..................... 123/122 D
3,459,163   8/1969    Lewis............................. 123/122 D
3,662,722   5/1972    Sarto.............................. 123/119 A
3,677,239   7/1972    Elkins............................. 123/119 A Primary Examiner—Dennis E. Talbert, Jr.
Attorney—Keith L. Zerschling and Robert E. McCollum

[57] ABSTRACT

A portion of the engine exhaust gases are connected to the engine air cleaner through valving that is opened to permit recirculation in response to normal accelerating levels of engine spark port intake manifold vacuum, and is closed to terminate recirculation upon a buildup in exhaust gas back pressure acting on the valving.

10 Claims, 3 Drawing Figures

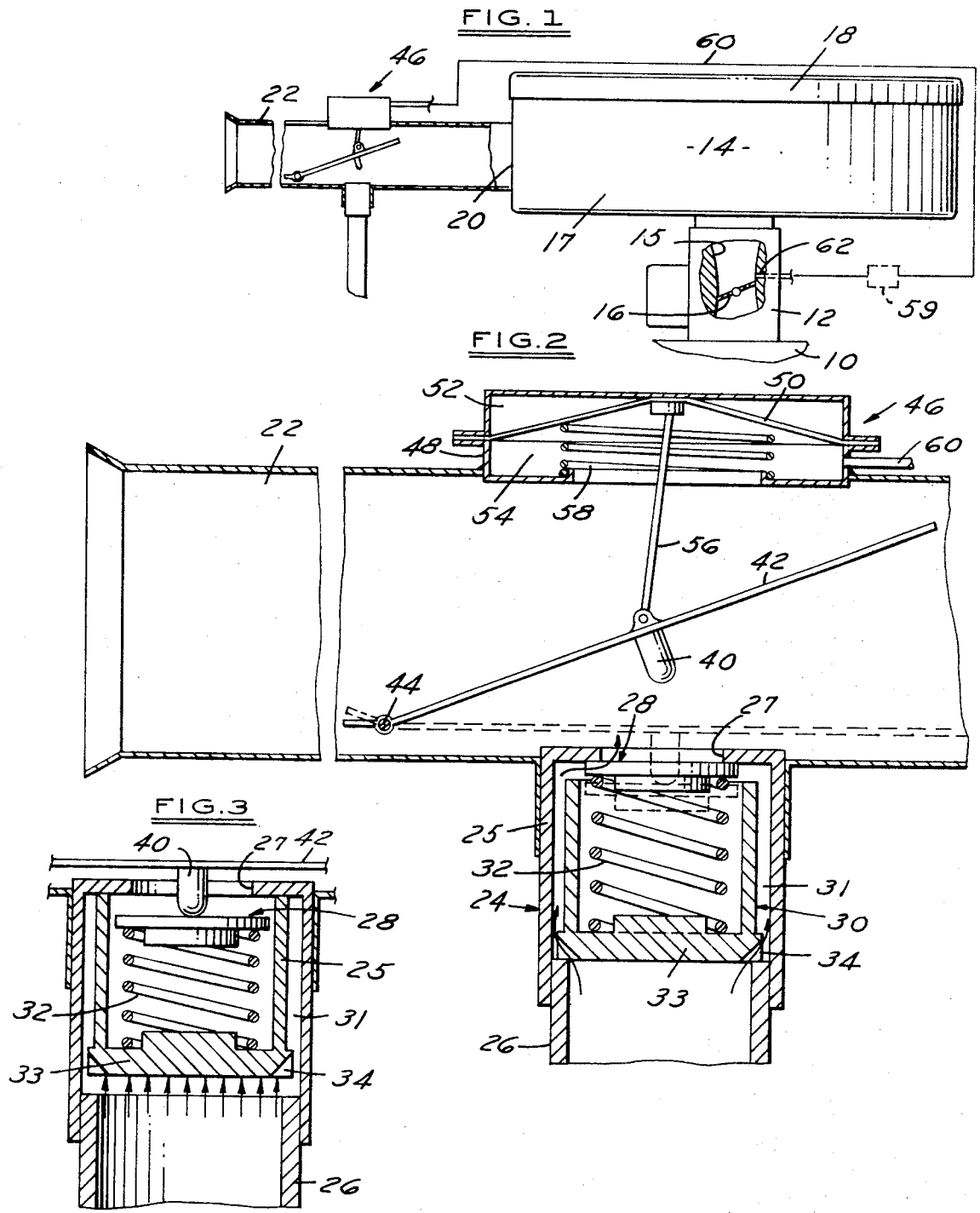

EXHAUST GAS RECIRCULATING SYSTEM CONTROL

This invention relates, in general, to an internal combustion engine, and more particularly to an apparatus for controlling the recirculating of engine exhaust gases back into the engine through the air cleaner.

The recirculation of exhaust gases into an engine reduces the amount of unburned hydrocarbons and other undesirable elements that might otherwise pass into the atmosphere, and also redcues the oxygen availability to thereby lower the peak combustion temperatures and pressure and, therefore, oxides of nitrogen.

The recirculation of exhaust gases into the engine generally is not desired during engine idle operation because, in general, the scavenging of exhaust gases from the engine cylinders at this time is not entirely satisfactory. Also, exhaust gas recirculation generally is not desirable during engine wide open throttle operating conditions because at this time the maximum output of the engine is determined by the total volume of oxygen available for combination with the fuel; therefore, any reduction in oxygen availability by recirculation of the exhaust gases would reduce the output.

The recirculating of the exhaust gases of an internal combustion engine is known. However, the prior art devices generally recirculate these gases into the intake manifold below the carburetor. This method of recirculation, however, does not permit the unburned hydrocarbons to pass through the metering system of the carburetor, and, accordingly, an accurate measurement of the exact fuel-air volume cannot always be made.

This invention obviates the above disadvantage by providing a connection of the exhaust gases to the air cleaner of the engine, with appropriate valving, to schedule the recirculation of exhaust gases into the engine at the most appropriate times.

The invention provides a valving that is controlled at times in response to variations in engine intake manifold vacuum to schedule the flow of exhaust gases into the air cleaner to occur during acceleration modes of operation, when the greatest quantity of oxides of nitrogen generally are generated.

It is a primary object of the invention, therefore, to provide an engine exhaust gas recirculating system to recirculate warm exhaust gases through the air cleaner by means of appropriate valving that schedules the flow during desired periods of operation.

It is another object of the invention to provide an engine exhaust gas recirculating system with valving that permits the flow of exhaust gases into the air cleaner of the engine in response to predetermined levels of operation of the engine intake manifold vacuum, a buildup in exhaust gas pressure level terminating the recirculation.

It is a still further object of the invention to provide an exhaust gas recirculating system that includes an exhaust gas duct connected to the fresh air inlet of the air cleaner, the flow of exhaust gases being controlled by a first door-type valve that is controlled in its movement by an engine intake manifold vacuum controlled servo, and an overriding valving for closing the duct when the exhaust gas pressure has risen to a predetermined level.

Other objects, features and advantages of the invention will become more apparent upon reference to the succeeding detailed description thereof, and to the drawings illustrating a preferred embodiment thereof; wherein, FIG. 1 illustrates, schematically, a side elevational view, with parts broken away and in section, of an engine air inlet supply system incorporating the invention;

FIG. 2 is an enlarged view of a portion of the FIG. 1 showing, with parts broken away and in section, illustrating the valving of the invention in one operative position; and FIG. 3 is a view of a portion of the FIG. 2 showing, illustrating the valving in a different operative position.

FIG. 1 shows the air inlet supply system for an internal combustion engine indicated schematically at 10. The latter has mounted on it a downdraft type carburetor indicated at 12, upon which is mounted a known type of dry element type air cleaner 14. Further details of construction and operation of the carburetor and engine per se are not given since they are known, and are believed to be unnecessary for an understanding of the invention. Suffice it to say, however, that the carburetor generally would have a venturi type induction passage or bore 15 open at its lower end to the intake manifold of engine 10, and an upper end opening into the air cleaner outlet (not shown) to receive therein a clean supply of fresh air. In this case, the outlet would also receive the exhaust gases recirculated in a manner to be described. Flow through the passage 15 would be controlled in a known manner by a rotatably mounted throttle valve 16.

As stated, the air cleaner 14 generally consists of a lower hollow tray section or pan 17 having a central outlet to the carburetor described, and enclosed at its top by a cover 18. It would contain, in general, an annular pleated paper or similar type dry element air filter that would clean any air or fluid that passes therethrough from an air inlet opening 20 in one side thereof.

More specifically, the air inlet 20 receives therein the end of a snorkel type air duct 22, only a portion of which is shown. This duct can be of the construction shown and described fully in U.S. Pat. No. 3,450,119, R.E. Sendelbach. For clarity, the details, except for the invention, are omitted. Suffice it to say that the air inlet snorkel 22 generally would have a bifurcated air inlet in which one portion of the duct receives fresh air from the vehicle engine compartment through the flared inlet 23, and the other portion of the duct receives air heated by passage over a stove, such as the exhaust manifold stove. A movable valve would control the proportion of fresh, colder air to exhaust stove air through the air cleaner into the engine as a function of operating temperatures and manifold vacuum, as more fully explained in U.S. Pat. No. 3,450,119.

Turning now to the invention, as more clearly shown in FIG. 2, a hollow tube 24 opens into duct 22 at essentially right angles thereto. The tube 24 consists of an inverted cup-shaped sleeve 25 in which is fixed in its open lower inlet end a conduit 26 containing exhaust gases from the exhaust manifold or system. At its other upper end, sleeve 25 has a circular opening or outlet 27 adapted to be closed by a hat-shaped or button type valve member or valve 28. The valve 28 forms one part of an overall valve means that controls the flow of exhaust gases from tube 24 into air duct 22 and inlet 20. A second part of the valve means is a cup-shaped valve member or valve 30 slidably movable within duct tube 24. The inner diameter of valve member 30 is of greater diameter than valve member 28 so as to slidably receive the latter therein in a telescopic manner. The outer diameter of the walls of valve member 30 is of less diameter than the inner diameter of sleeve 25 so as to provide a passage 31 for flow of exhaust gases between the two portions. A compression spring 32 biases the two valve members 28 and 30 apart, urging valve member 28 to seat against the bottom of sleeve 25 and the end 33 of valve member 30 to seat against the end of the exhaust gas conduit 26. In this manner, valve member 28 normally blocks off the passage of exhaust gases out into the air cleaner duct 22. The base 33 of second valve member 30 is slotted diagonally at 34 so as to always permit a flow of exhaust gases into passage 31 between valve member 30 and sleeve 24.

The force of spring 32 is chosen such as to normally position the parts as shown in FIG. 2, but, however, permitting a movement of valve member 30 to the position shown in FIG. 3 upon a suitable increase in the pressure of the exhaust gases acting against the bottom of valve member 30. In this way, a buildup of exhaust gas pressure will seat the second valve member 30 against the upper end of sleeve 25 and block the flow of exhaust gases into the air cleaner under these conditions.

Completing the construction, the first valve member 28 is adapted to be moved downwardly to open the exhaust gas duct to the air cleaner by means of a stem type actuator 40. The latter is attached to a plate 42 pivoted at 44 to a portion of duct 22. The plate 42 in turn is swung vertically by a vacuum controlled servo 46 of a known diaphragm type. That is, the servo body 48 is hollow and contains a flexible annular diaphragm 50 dividing the housing into an atmospheric air chamber 52 and a vacuum chamber 54. The diaphragm is connected to plate 42 by a suitable link 56. A compression spring 58 normally biases the diaphragm to the upward position shown holding door 42 and actuator 40 in the full line position shown.

A vacuum line 60 is connected to chamber 54, and is adapted to be connected at its opposite end to the intake manifold of the engine so as to subject chamber 54 to changing intake manifold vacuum levels. In this case, to assure recirculation of exhaust gases only during the acceleration periods desired, as mentioned above, vacuum line 60 is connected to the spark port 62 of the carburetor located just above the idle speed position of throttle valve 16. Thus, when the throttle valve is closed, as shown, during engine idle speed operations, no vacuum will exist in line 60; i.e. atmospheric pressure will be present permitting spring 58 to position the plate door 42 and actuator 40 as shown. At engine wide open throttle positions, wherein the throttle valve 16 is nearly vertical, initially the engine intake manifold vacuum will be very low, i.e., the pressure will be nearly atmospheric again causing the servo to position to the plate door 42 as shown.

If desired, a further on-off control, indicated by the block 59, could be provided in line 60, and would be speed responsive so that, for example, below a speed of sayd 28 m.p.h., for example, line 60 would be blocked, thereby rendering the servo ineffective below 28 m.p.h. to move plate 42 and permit exhaust recirculation.

In operation, as stated above, the primary object of the invention is to control exhaust gas recirculation to be effective essentially during the acceleration mode of operation so that the exhaust gases are not recirculated during engine idle operating conditions nor at engine wide open throttle conditions. This is effectively obtained by the use of intake manifold vacuum and exhaust back pressure as controls and/or alternatively combined with a vehicle speed responsive control.

In brief, prior to engine start up, the parts are in the position shown in which actuator 40 is maintained out of contact with valve member 28 by means of spring 58. Upon engine start up, at engine idle speed condition, the spark port vacuum is essentially atmospheric pressure permitting vacuum servo spring 58 to maintain valve actuator 40 in the position shown. During a part throttle condition of acceleration, the spark port vacuum in port 62 will increase, thereby increasing the vacuum level in servo chamber 54 and causing plate valve 42 with its actuator 40 to move down to the dotted line position against and move open valve member 28. This permits exhaust gas to pass through passage 31 and out into the air cleaner snorkel duct 22 to be recirculated into the engine. This latter operation assumes that the vehicle speed is above 28 m.p.h., if a vehicle speed responsive switch 59 is used.

During the acceleration mode, the exhaust back pressure in conduit 26 will slowly increase until the point is reached where the force acting against the bottom of valve member 30 is sufficient to compress spring 32 and move valve member 30 upwardly to seat and close off passage 26. This shuts off the recirculation of exhaust gases into the air cleaner, regardless of the position of valve member 28.

During wide open throttle operation, the decay of spark port vacuum to essentially atmospheric pressure in servo chamber 54 permits spring 58 to maintain plate 42 in the full line position shown, comparable to the engine idle speed operating condition, or to the position below a vehicle speed of 28 m.p.h. No exhaust gas recirculation, therefore, occurs at this time.

From the foregoing, it will be seen that the invention provides an effective exhaust gas recirculation system to recirculate the exhaust gases into the engine during the acceleration modes of operation, while effectively preventing the recirculation during engine idle and wide open throttle conditions of operation of the engine, or during deceleration, and alternatively, below a vehicle speed of a predetermined level of, say, 28 m.p.h.

I claim:

1. A system for recirculating exhaust gases from the exhaust manifold of an internal combustion engine back into said engine through the air cleaner thereof, said air cleaner comprising a housing having an outlet to the carburetor of said engine and a fresh air inlet, a conduit containing exhaust manifold gases operatively connected to said inlet, first means variably movable between positions opening and closing said conduit to control the flow of exhaust gas into said air cleaner and carburetor, vacuum power means controlled in response to variations in engine intake manifold vacuum to move said first means between said positions, second valve means controlling the flow of exhaust gases out of said conduit, and spring means biasing said second valve means to a position closing said gas conduit, said first means moving said second valve means to open said gas conduit.

2. A system as in claim 1, said second valve means having a first passage connected at all times to said exhaust gases, a movable valve member biased by said spring means to a position closing said passage, said first means engaging said valve member and moving said valve member to open said passage at times to said air inlet, an increase in pressure of said exhaust gases above a predetermined level effecting a closing of said passage.

3. A system as in claim 1, said second valve means being acted upon by said gases and movable above a predetermined pressure thereof in a direction to close said gas conduit to terminate flow of said gases into said air cleaner.

4. A system as in claim 3, said second valve means including a second valve member movable by said exhaust gases acting thereagainst to close said passage.

5. A system as in claim 4, said spring means being positioned between said first and second valve members.

6. A system for recirculating exhaust gases from the exhaust manifold of an internal combustion engine back into said engine through the air cleaner thereof, said air cleaner comprising a housing having an outlet to the carburetor of said engine and a fresh air inlet, a conduit containing exhaust manifold gases and operatively connected to said inlet, first means variably movable between positions opening and closing said conduit to control the flow of exhaust gas into said air cleaner inlet to the carburetor, vacuum power means controlled in response to variations in engine intake manifold vacuum to move said first means between said positions, second valve means controlling the flow of exhaust gases out of said conduit, said second valve means including a valve body defined by the conduit having a gas inlet and outlet and a gas passage therebetween, said gas inlet containing said exhaust gases and said gas outlet being operatively connected to said air inlet, first and second valve members movably associated respectively with said gas outlet and gas inlet, spring means between said valve members biasing said members to seated positions against said gas inlet and gas outlet closing said gas outlet, said first means in its movement engaging said first valve member to move said first valve member to open said gas outlet, a rise in exhaust gas pressure above a predetermined level moving said second valve member to close said gas outlet.

7. A system as in claim 6, said second valve member including gas bypass means permitting bypass of exhaust gases through said gas inlet past said second valve member.

9. A system as in claim 6, said second valve member including means engagable with said valve body to close said passage regardless of the position of said first valve member.

8. A system as in claim 6, said first valve member having essentially a disc-like shape, said second valve member having essentially a U-shape receiving the first valve member at times in the open end thereof.

10. A system as in claim 9, the legs of said second valve member defining with said valve body the said passage, said legs being engagable with said valve body to close said passage.

* * * * *